(12) United States Patent
Takeda et al.

(10) Patent No.: US 8,193,307 B2
(45) Date of Patent: Jun. 5, 2012

(54) SYNTHESIS OF PHOTORESIST POLYMER

(75) Inventors: Takanobu Takeda, Joetsu (JP); Tamotsu Watanabe, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 341 days.

(21) Appl. No.: 12/177,403

(22) Filed: Jul. 22, 2008

(65) Prior Publication Data

US 2009/0030177 A1  Jan. 29, 2009

(30) Foreign Application Priority Data

Jul. 23, 2007 (JP) ................................ 2007-190592

(51) Int. Cl.
*C08F 6/00* (2006.01)
(52) U.S. Cl. ..... 528/480; 528/490; 528/491; 528/502 R; 528/502 A; 210/634; 210/705; 210/767; 210/768; 430/269
(58) Field of Classification Search ............ 528/480, 528/481, 482, 486, 489, 490, 491, 493, 494, 528/495, 496, 497, 498, 499, 501, 502 R, 528/502 A, 502 D; 430/192, 269, 270.1; 427/352, 372.2; 210/34, 651, 652, 654, 660, 210/702, 703, 705, 634
See application file for complete search history.

(56) References Cited

U.S. PATENT DOCUMENTS

| | | | |
|---|---|---|---|
| 6,121,412 A | 9/2000 | Wanat et al. | |
| 6,261,734 B1 | 7/2001 | Platzer | |
| 6,902,772 B2 | 6/2005 | Takeda et al. | |
| 7,342,087 B2 | 3/2008 | Yamagishi et al. | |
| 7,378,218 B2 | 5/2008 | Harada et al. | |
| 2003/0144470 A1* | 7/2003 | Sheehan | 528/491 |
| 2004/0171773 A1* | 9/2004 | Bu et al. | 526/72 |
| 2005/0208424 A1 | 9/2005 | Hasegawa et al. | |
| 2005/0271978 A1 | 12/2005 | Takeda et al. | |
| 2006/0058433 A1 | 3/2006 | Yamagishi et al. | |
| 2006/0166133 A1 | 7/2006 | Koitabashi et al. | |
| 2007/0148587 A1* | 6/2007 | Russell et al. | 430/270.1 |

FOREIGN PATENT DOCUMENTS

| | | |
|---|---|---|
| JP | 05-142778 A | 6/1993 |
| JP | 06-266099 A | 9/1994 |
| JP | 2002-251009 A | 9/2002 |
| JP | 2003-529621 A | 10/2003 |
| JP | 2004-035671 A | 2/2004 |
| JP | 2005-264103 A | 9/2005 |
| JP | 2005-344009 A | 12/2005 |
| JP | 2006-016490 A | 1/2006 |
| JP | 2006-083214 A | 3/2006 |
| JP | 2006-201532 A | 8/2006 |
| JP | 2006-213835 A | 8/2006 |

* cited by examiner

*Primary Examiner* — James J Seidleck
*Assistant Examiner* — Frances Tischler
(74) *Attorney, Agent, or Firm* — Westerman, Hattori, Daniels & Adrian, LLP

(57) ABSTRACT

A polymer for use in photoresist compositions is synthesized by effecting polymerization reaction to form a polymerization product mixture and subjecting the mixture to molecular weight fractionation by a liquid phase separation technique using a good solvent and a poor solvent. The fractionation step is iterated at least twice, and one iteration of fractionation includes adding a good solvent which is different from the good solvent added in the other iteration of fractionation.

9 Claims, 1 Drawing Sheet

SYNTHESIS OF PHOTORESIST POLYMER

CROSS-REFERENCE TO RELATED APPLICATION

This non-provisional application claims priority under 35 U.S.C. §119(a) on Patent Application No. 2007-190592 filed in Japan on Jul. 23, 2007, the entire contents of which are hereby incorporated by reference.

TECHNICAL FIELD

This invention generally relates to a method for synthesizing a polymer to be added to photoresist compositions while controlling its dispersity. More particularly, it relates to a method for synthesizing a polymer useful as a base resin in chemically amplified positive or negative photoresist compositions.

BACKGROUND ART

The micro-photolithography is used in the processing of microelectronic devices. As a pattern with a finer feature size is needed, it is more strictly required to control the physical properties of components of which photoresist compositions are made. For a polymer used as one component of photoresist compositions, for instance, it is crucial to control its molecular weight and dispersity as well as its chemical structure. As used herein, the term "dispersity" representative of a molecular weight distribution is defined as weight average molecular weight divided by number average molecular weight, i.e., Mw/Mn.

It has long been practiced to control the dispersity of a polymer used in photoresist compositions. For example, JP-A 5-142778 discloses a novolak resist composition comprising a novolak resin with a reduced dispersity so that the resist pattern is more heat resistant. JP-A 6-266099 discloses chemically amplified positive and negative resist compositions comprising a vinyl phenolic resin wherein not only the resist technology and the novolak resin are tailored, but also the dispersity of the resin is reduced, thereby improving the roughness of a pattern. JP-A 2002-251009 discloses that a reduction of the dispersity of an acrylic resin having alicyclic structure contributes to a higher resolution.

While low dispersity polymers are obtainable directly through such reaction as living polymerization, polymers synthesized otherwise generally have high dispersity and contain an amount of low-molecular-weight compounds which detracts from resolution. The low-molecular-weight fraction must be removed from such a polymer product by any suitable means of molecular weight fractionation.

The polymer fractionation may generally be achieved by several methods including re-precipitation of polymer, and a liquid phase separation technique of adding a polymer to a solvent system of a good solvent and a poor solvent and selecting a set of conditions under which the good solvent and the poor solvent separate into two distinct phases. Of these, the liquid phase separation technique is advantageous in that this additional step imposes only a small load to the commercial production process because of a high percent recovery and ease of operation in a large scale. For example, U.S. Pat. No. 6,121,412 (or JP-A 2003-529621) discloses molecular weight fractionation of novolak resin by a liquid phase separation technique involving separation of two liquid phases by centrifugation.

The related patent references include JP-A 2004-035671, JP-A 2005-264103, JP-A 2005-344009, JP-A 2006-201532, and JP-A 2006-213835.

DISCLOSURE OF THE INVENTION

Where it is desired to reduce the dispersity of higher polymers, it is readily anticipated that the purpose may be accomplished by applying the fractionation operation multiple times. When the expense and time taken by the fractionation step are considered, a method capable of efficiently reducing dispersity is apparently needed. However, an attempt to reduce the dispersity as low as possible by a single step of fractionation generally encounters a decline of percent recovery. In general, there is a tradeoff between percent recovery and dispersity reduction efficiency.

In the case of a polymer for use in a chemically amplified resist composition, different fractionation techniques can bring about different results. When two polymers fractionated by different techniques and having insignificantly differing values of dispersity are used in chemically amplified resist compositions, resist patterns formed therefrom can have different profiles.

An object of the invention is to provide a polymer synthesis method involving a fractionation step by a liquid phase separation technique capable of reducing the dispersity of polymer without a substantial decline of percent recovery. Another object is to provide a method for the synthesis of a polymer which is used to formulate a photoresist composition, specifically a chemically amplified resist composition, which is processed to form a resist pattern with better profile.

With respect to molecular weight fractionation by a liquid phase separation technique using a good solvent and a poor solvent, the inventors have found that when the fractionation step is iterated twice or more times, and a different good solvent is added in one iteration of fractionation, then the polymer product is fractionated without a substantial decline of percent recovery. The inventors have also found that when a photoresist composition is formulated using the fractionated polymer, a resist pattern with improved profile can be formed from the composition.

In one aspect, the invention provides a method for synthesizing a polymer for use in photoresist compositions, comprising the steps of effecting polymerization reaction to form a polymerization product mixture, and subjecting the mixture to molecular weight fractionation by a liquid phase separation technique using a good solvent and a poor solvent. The fractionation step is iterated at least twice, and at least one of the at least two iterations of fractionation includes adding a good solvent which is different from the good solvent added in the other iteration of fractionation. Advantageously, the molecular weight fractionation by this liquid phase separation technique does not invite a substantial decline of percent recovery, and a photoresist composition formulated using the fractionated polymer can be processed to form a resist pattern with improved profile.

In one preferred embodiment, the good solvent which is different from the good solvent added in the other iteration of fractionation is of different type from the good solvent added in the other iteration of fractionation. This embodiment ensures that a material or fraction having different physical properties to be removed is removed efficiently under the conditions for the one and other iterations of fractionation. The desired polymer is recovered more efficiently.

In another preferred embodiment, the good solvent which is different from the good solvent added in the other iteration of fractionation is a mixture of two or more solvents in a mixing ratio different from that in the good solvent added in the other iteration of fractionation. This embodiment allows for relatively easy selection of conditions for phase separation between the poor solvent and the liquid polymer because the at least two iterations of fractionation use the same solvents.

In a further embodiment, the at least two iterations of fractionation include early and late iterations of fractionation using different good solvents, and the good solvent used in the late iteration of fractionation has a higher dissolving power of the polymer. Specifically, when two or more iterations of fractionation are performed, there are included early and late iterations of fractionation using mutually different good solvents. Preferably the good solvent used in the late iteration of fractionation (if the late iteration of fractionation includes a plurality of iterations of fractionation, at least one of the plurality of iterations) has a higher dissolving power of the polymer than the good solvent used in the early iteration of fractionation. This selection ensures that an amount of the polymer is recovered without a substantial loss.

More preferably, the polymer recovered at the end of at least two iterations of fractionation has a dispersity (Mw/Mn) equal to or less than 1.8. The polymer synthesis method of the invention is especially advantageous when a polymer having a dispersity equal to or less than 1.8 is desired.

BENEFITS OF THE INVENTION

According to the invention, when the polymer product resulting from polymerization reaction is subjected to molecular weight fractionation, the object of reducing the dispersity of the polymer is achievable without a substantial loss of the polymer. A resist composition which is formulated using the polymer thus fractionated can be processed to form a resist pattern with improved profile.

DESCRIPTION OF THE PREFERRED EMBODIMENT

Figure 1:
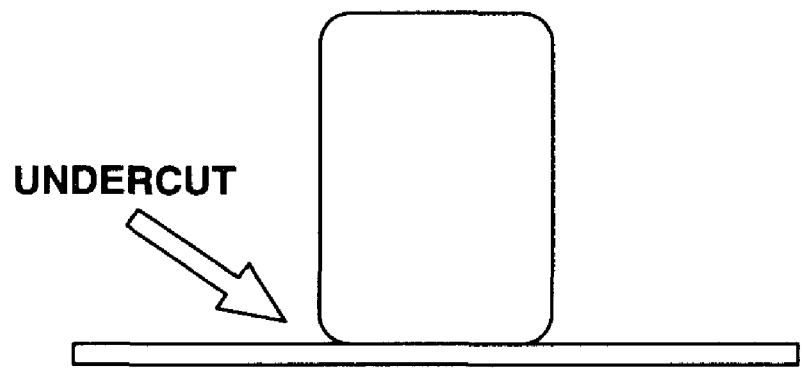
FIG. 1 schematically illustrates a resist pattern with undercut.

The singular forms "a," "an" and "the" include plural referents unless the context clearly dictates otherwise.

The term "dispersity" as used herein in conjunction with a polymer is representative of a molecular weight distribution and defined as weight average molecular weight (Mw) divided by number average molecular weight (Mn), i.e., Mw/Mn. The weight and number average molecular weights are determined by gel permeation chromatography (GPC) versus polystyrene standards.

The synthesis method of the invention provides a polymer for use as a base polymer in a photoresist composition and to this end, typically having a weight average molecular weight (Mw) of 2,000 to 30,000 and more specifically 3,000 to 20,000. The method starts with the step of effecting polymerization reaction to form a polymerization product mixture. Any suitable polymerization technique may be employed, including radical polymerization, anionic polymerization, and cationic polymerization. Better results are obtained from the synthesis method relying on radical polymerization because a polymerization product mixture resulting from radical polymerization has a relatively high dispersity.

Suitable polymers resulting from radical polymerization and for use in photoresist compositions include, but are not limited to, polymers composed mainly of units of hydroxystyrene derivatives for use in chemically amplified resist compositions subject to lithographic processes using KrF excimer laser exposure and EB irradiation (as described in JP-A 2005-344009 and JP-A 2006-201532, for example); polymers composed mainly of units of (meth)acrylate derivatives for use in resist compositions subject to lithographic processes using ArF excimer laser exposure (as described in JP-A 2005-264103 and JP-A 2006-213835, for example); and COMA polymers composed mainly of norbornene and maleic anhydride units (as described in JP-A 2004-35671, for example). The invention is applicable to any of the above polymers.

In the design of constituent units of a polymer for use in the photoresist composition, if the resist composition is of positive working type, a combination of constituent units is designed such that the polymer is normally insoluble in an aqueous alkaline developer, but under the action of acid, the polymer turns to be soluble in the aqueous alkaline developer as a result of acid labile protective groups being deprotected. In the case of a negative working resist composition typically having a crosslinker added thereto, a combination of constituent units is designed such that the polymer is normally soluble in an aqueous alkaline developer, but under the action of acid, the polymer turns to be insoluble in the aqueous alkaline developer as a result of crosslinks being formed between polymer molecules and/or between the polymer and the crosslinker.

Whether the chemically amplified resist composition is positive or negative, and whether the resin is aromatic (e.g., JP-A 2005-344009 and JP-A 2006-201532) or alicyclic (e.g., JP-A 2005-264103, JP-A 2006-213835 and JP-A 2004-35671), the polymer for use in such photoresist compositions must meet some requirements including firm adhesion to an intermediate substrate for microelectronic processing or an antireflective coating formed thereon and anti-swelling. To meet these requirements, recurring units having an adequate polarity are introduced into the polymer. Whether the resist composition is positive or negative, the polymer also needs to include highly fat-soluble recurring units. For the positive type, the highly fat-soluble acid-labile protective groups are modified so that the polymer is insoluble in the alkaline developer prior to reaction with acid. For the negative type, units having fat-solubility are introduced to restrict the rate of dissolution in the alkaline developer in order to gain the desired resolution. Then, although the resins for negative use tend to have relatively higher polarity, the resins for negative and positive uses exhibit little difference in their overall polarity and have a solubility in numerous solvents within a certain range. For example, these resins are no dissolved in extremely high polarity solvents such as water, extremely low polarity solvents such as heptane, hexane and pentane, and low polarity solvents such as cyclohexane, benzene and toluene. Then, as will be described later, these solvents including water, heptane, hexane, pentane, cyclohexane, benzene and toluene are poor solvents relative to the polymers for photoresist compositions, when used alone. While the terms "poor solvent" and "good solvent" are commonly used in conjunction with a single solvent, the solvent is designated good or poor when a solute is fully dissolvable therein or not. Herein, the terms "poor solvent" and "good solvent" are also used in the context that when two or more solvents are combined into a mixture that serves as poor or good solvent, the solvent mixture is referred to as poor or good solvent depending on the solvent mixture's ability to dissolve a solute.

For the polymer for use in the photoresist composition, it is necessary to control the inclusion of unnecessary low-molecular-weight compounds to a minimum level. Usually, after the polymerization reaction, the polymerization product mixture containing the polymer is worked up so as to remove low-molecular-weight compounds such as monomers and polymerization initiator. In one exemplary procedure known as precipitation procedure, the polymerization product mixture is dissolved in a solvent in which a small amount of polymer is dissolvable (good solvent) and which is dissolvable in a poor solvent. With stirring, the solution is added dropwise to a large volume of poor solvent, whereby small solid flakes of the polymer form. The flakes are collected by filtration while low-molecular-weight compounds such as unreacted monomers and initiator are left dissolved in the poor solvent side. The precipitation procedure, however, has some problems including a large volume of poor solvent and a load on the filtration step. Additionally, handling the polymer as solid may entail a loss during the process.

In contrast, when the polymerization product mixture containing the polymer dissolved in such a small volume of good solvent that the polymer may not solidify during the process is fed with a poor solvent, agitated and allowed to stand, there is obtained a liquid system that separates into two phases, poor solvent phase and polymer-containing phase. At this point, low-molecular-weight compounds are dissolved in the poor solvent phase, as in the above precipitation procedure, and the polymer is left in the polymer phase. Then the low-molecular-weight compounds can be removed by liquid phase separation. It is noted that the liquid phase separation referred to herein is not a standard liquid phase separation procedure, as used in extraction and like operations, using two solvents which are mutually inmiscible and form two distinct phases, but an operation using a combination of poor and good solvents which are miscible to a certain extent when they are mixed together without further solvents.

When a liquid phase separation technique as mentioned above is carried out, part of the good solvent is migrated to the poor solvent phase and at the same time, low-molecular-weight compounds which are more soluble in the poor solvent than the polymer are dissolved therein. In the precipitation procedure, which requires the polymer to be solidified, the good solvent must migrate quickly, for the most part, from the polymer side to the poor solvent side, and the type and amount of solvent which can be used are thus strictly limited. The liquid phase separation technique is free from such requirements. Then the liquid phase separation technique is advantageous in that the polymer can be handled in fluid state, and the type and amount of good solvent are selected from wide ranges so that it is easy to select a combination of good solvent and poor solvent capable of excluding more oligomers while retaining more polymers near the center of molecular weight distribution. Thus the liquid phase separation technique can be effectively used for the molecular weight fractionation.

However, since the molecular weight fractionation by liquid phase separation does not necessarily have a high selectivity in terms of molecular weight, an attempt to exclude a low-molecular-weight fraction at a time can lead to a substantial lowering of percent recovery. It is then advantageous to carry out fractionation by plural iterations of liquid phase separation. When fractionation is iterated under the same conditions, the dispersity may be reduced by increasing the number of iterations of fractionation; however, there is a tradeoff between the dispersity arrived at by such iterations and the percent recovery of the desired fraction.

In the course of research work, the inventors found a set of two phase separating conditions under which liquid phase separation could be carried out, and performed molecular weight fractionation by plural iterations of liquid phase separation under that set of conditions. The inventors learned that the fraction that was excluded could vary depending on a choice of good solvent. The inventors have found that in a process including plural iterations of fractionation by a liquid phase separation technique, when one iteration of fractionation is carried out using a good solvent which is different from the good solvent used in the other iteration(s) of fractionation, this is successful in reducing the dispersity of polymer without lowering the percent recovery below an acceptable level.

First referring to the poor solvent which is used herein, it is essential to select the poor solvent in which a polymer product subject to molecular weight fractionation is not dissolvable when adding the poor solvent is added to the polymer product in an amount 5 times greater than the polymer product on a weight basis, and agitating the mixture, and more specifically, when the poor solvent is added to the polymer product in an amount 10 times greater than the polymer product on a weight basis. The poor solvent may be a single solvent in which the polymer product is not dissolvable, or a mixture of such solvents, or a mixture of a poor solvent in which the polymer product is not dissolvable and a minor amount of a good solvent (which will be described below), if the mixture satisfies the above requirement.

On the other hand, the good solvent is the solvent in which the polymer product is fully dissolvable. The good solvent is defined as the solvent in which a polymer product subject to molecular weight fractionation is thoroughly dissolvable in an amount of the solvent which is up to 5 times greater than the polymer product on a weight basis, and more specifically, up to 3 times greater than the polymer product. The good solvent may be a single solvent or a mixture of solvents. Alternatively, a solvent having rather low dissolving power when used alone may be selected as one solvent to be mixed into a good solvent if a mixture thereof with another solvent satisfies the above requirement.

Exemplary solvents which can serve as the good solvent include those commonly used in fractionation, such as acetone, ethyl acetate, methyl acetate, propylene glycol monomethyl ether, propylene glycol monoethyl ether, tetrahydrofuran, diethyl ether, and isopropanol; and those used as the resist solvent, such as butyl acetate, amyl acetate, cyclohexyl acetate, 3-methoxybutyl acetate, methyl ethyl ketone, methyl amyl ketone, cyclohexanone, cyclopentanone, 3-ethoxyethyl propionate, 3-ethoxymethyl propionate, 3-methoxymethyl propionate, methyl acetoacetate, ethyl acetoacetate, diacetone alcohol, methyl pyruvate, ethyl pyruvate, propylene glycol monomethyl ether, propylene glycol monoethyl ether, propylene glycol monomethyl ether propionate, propylene glycol monoethyl ether propionate, ethylene glycol monomethyl ether, ethylene glycol monoethyl ether, diethylene glycol monomethyl ether, diethylene glycol monoethyl ether, 3-methyl-3-methoxybutanol, N-methylpyrrolidone, dimethyl sulfoxide, γ-butyrolactone, propylene glycol methyl ether acetate (PGMEA), propylene glycol ethyl ether acetate, propylene glycol propyl ether acetate, methyl lactate, ethyl lactate, propyl lactate, and tetramethylene sulfone. In some limited embodiments, methanol and ethanol may be used as the good solvent or one of the good solvent mixture.

The polymer synthesis method of the invention is characterized in that among at least two iterations of fractionation, at least one iteration of fractionation includes liquid phase separation using a good solvent which is different from the good solvent used in the other iteration of fractionation. As used herein, the different solvent is a solvent of different type in one embodiment. The good solvent which is used in this embodiment may be either a single solvent or a mixture of two or more solvents at least one of which is of different type. In an example, a first iteration of fractionation uses acetone as the good solvent and a second iteration of fractionation uses propylene glycol monomethyl ether acetate (PGMEA). In another example, a first iteration of fractionation uses acetone as the good solvent and a second iteration of fractionation uses a mixture of acetone and PGMEA as the good solvent.

In an alternative embodiment, the different solvent is a mixture of solvents which are of the same type as the good solvent used in the other iteration of fractionation, but present in a different ratio. This embodiment using a mixture of solvents as the good solvent includes an example in which a first iteration of fractionation uses a mixture of acetone and PGMEA in a weight ratio of 3:1 as the good solvent, and a second iteration of fractionation uses a mixture of acetone and PGMEA in a weight ratio of 1:3 as the good solvent. As used herein, a different weight ratio does not encompass errors, for example, a case wherein one solvent having accounted for 18 wt % of the good solvent increases to 22 wt %, and a difference associated with a trace component which does not significantly vary as absolute amount, but significantly varies as percentage, for example, a case wherein a trace component having been contained in 0.1 wt % increases to 0.5 wt %. By contrast, if a component (solvent) having been contained in less than 1 wt % in one system increases to 5 wt % or more in another system, then the case is regarded as providing a different weight ratio. Similarly, the case is regarded as providing a different weight ratio if a component having been contained in an amount of 1 wt % to less than 10 wt % increases to 20 wt % or more, or if a component having been contained in an amount of 10 wt % to less than 20 wt % increases to 40 wt % or more, or if a component having been contained in an amount of 20 wt % to less than 30 wt % increases to 60 wt % or more.

In the former embodiment wherein the different solvent is a solvent of different type, there is a good probability that an unwanted fraction entrained with the good solvent component migrating to the poor solvent side can vary depending on the selection of solvent. This embodiment is more effective for excluding an unwanted fraction which would be otherwise retained under particular conditions.

The latter embodiment offers ease of operation in that if a phase-separable condition under which the polymer in liquid state provides phase separation from the poor solvent phase is found, then a condition for liquid phase separation in a second different mixing ratio can be relatively readily found. If two ratios of solvents differ largely, substantially the same effect as in the former embodiment is achievable.

It is preferable to exclude an unwanted fraction (low-molecular-weight fraction) while minimizing a decline of percent recovery. In another preferred embodiment, while the at least two iterations of fractionation include early and late iterations of fractionation using different good solvents, the good solvent used in the late iteration of fractionation has a higher dissolving power of the polymer to be fractionated. In a situation where an unwanted fraction to be excluded is contained in a large amount, if the unwanted fraction is entrained to the poor solvent side together with migration of the good solvent, the polymer to be retained can be entrained to the poor solvent side at the same time. Then if a relatively earlier iteration of fractionation uses a good solvent having too high an ability of entrainment to the poor solvent side, then the percent recovery of the desired polymer can be reduced. On the other hand, at a stage when the amount of the unwanted fraction is reduced to a substantial extent, a condition where a stronger exclusion power develops is selected whereby more effective fractionation is achievable. In an actual combination of fractionation operations, the fractionation operation using a good solvent with the highest dissolving power need not necessarily be final. In an example where three iterations of fractionation are included, the second iteration may be carried out under conditions using a good solvent with the highest dissolving power such that the amount of the fraction to be excluded is very small at the third iteration as a finish fractionation operation.

When the invention is applied for the first time to a particular polymer product mixture resulting from polymerization reaction, candidates for the poor and good solvents must be selected. In one approach, the solvents applicable to liquid phase separation may be determined on a trial-and-error basis. However, another approach of once obtaining a polymer as an aliquot sample by a standard precipitation process, and predetermining the range of poor and good solvents using that sample is more efficient.

The poor solvent can be readily determined by a dissolution test whether or not it meets the above-described requirements. In the test, a polymer is placed in a sample tube with a screw cap, a poor solvent candidate is added thereto in an amount of 5 to 10 times greater than the weight of the polymer, and the tube is shaken for several hours. The solvent in which the polymer is not dissolved at the end of this test is selected as the poor solvent. Similarly, the good solvent is selected if the polymer is completely dissolved at the end of a test performed by adding a solvent in an amount of up to 5 times greater than the weight of the polymer, and shaking for several hours.

Notably, it is difficult to determine directly which of two solvents is a better solvent. It is possible to determine which of two solvents is a better solvent by adding hexane (poor solvent) in a certain weight ratio to the two solvents in comparison for thereby reducing the solubility of polymer, and comparing solubility reductions.

Among solvents commonly used in fractionation, a measure of the order of better solvents is given below. The group of extremely good solvents includes tetrahydrofuran, propylene glycol monomethyl ether, and propylene glycol monoethyl ether; the group of moderately good solvents includes acetone, ethyl acetate, and methyl acetate; and the group of faintly good solvents includes diethyl ether, isopropanol, ethanol, and methanol.

In the polymer synthesis method of the invention, the unit operation of fractionation by a liquid phase separation technique is preferably performed as follows. First, a solution of a polymer-containing solute is prepared by adding a good solvent in an amount of 0.5 to 5 times, preferably 0.7 to 3 times, greater than the weight of the solute. To this solution, a poor solvent is added in an amount of 2 to 25 times, preferably 2 to 15 times, greater than the weight of the solute. The resulting mixture is thoroughly mixed and then allowed to stand. If the amount of the good solvent is too small, the fraction to be removed by fractionation cannot be fully removed. If the amount of the good solvent is too large, the percent recovery can be substantially exacerbated. If the amount of the poor solvent is too small, the percent recovery can be substantially exacerbated. If the amount of the poor solvent is too large, the fractionation can be insufficient.

After the mixture has fully separated into two phases during static holding, the poor solvent phase (typically upper layer) is removed, leaving the polymer phase which has been molecular weight fractionated. The amount of recovery depends on the selection of good and poor solvents and the amounts thereof added as mentioned above. As one exemplary measure, conditions are selected such that the weight of the polymer phase at the last stage of two phase separation is about 60 to 90%, and preferably about 70 to 85%, of the total weight of the solute and the good solvent. As a measure of addition of the good solvent for performing the second and subsequent iterations of liquid phase separation, in case the polymer phase is once concentrated, the addition of solvents in the first iteration may be applied without modification. However, in case the subsequent liquid phase separation is commenced without concentrating the polymer phase, a weight reduction of the phase available as the polymer phase after phase separation relative to the total weight of the polymer and good solvent used in the first iteration of fractionation is determined, and an amount of 0.5 to 1.5 times (by weight) the weight reduction is one measure for the amount of good solvent added to the subsequent liquid phase separation. It is noted that a quantitative measurement by gas chromatography of a sample having an additional solvent added is applicable to confirm a mixing ratio of solvents used, although a reproducibility corresponding to a significant figure of three digits is unnecessary. Now that such conditions for the good and poor solvents are selected, plural iterations of fractionation can be performed without a substantial loss of percent recovery, whereby the dispersity can be effectively reduced. As a matter of course, the percent recovery depends on the molecular weight of the desired polymer and the relative content of low-molecular-weight fraction. Where fractionation is performed for the first time, fractionation is iterated while monitoring the dispersity of the polymer recovered by gel permeation chromatography (GPC).

While the number of iterations of fractionation may be determined as appropriate, it is preferably 2 to 6 iterations, and more preferably 2 to 4 iterations.

The polymer phase obtained by the method described above contains the desired polymer and the good solvent. In order to formulate a resist composition from the polymer phase, the polymer may be separated from the polymer phase by a precipitation technique of once solidifying the polymer and removing the good solvent therefrom. If the good solvent has a relatively low boiling point, it may be replaced by a resist solvent by adding the resist solvent to the polymer phase and distilling off the unnecessary low-boiling solvent. If a resist solvent is used in the liquid phase separation, a resist composition may be prepared by distilling off the unnecessary good solvent used concurrently therewith and the residual poor solvent, and adjusting the concentration. Since too high a polymer concentration generally reduces the efficiency of distilling off the low boiling solvent, it is recommended to add an amount of resist solvent prior to the solvent distillation.

The polymer for use in photoresist compositions that can take advantage of the present invention is a crude polymer mixture which is available as the reaction product of radical polymerization, has a high molecular weight dispersity, and contains a relatively large amount of low-molecular-weight compounds, prior to fractionation. Radical polymerization often results in a product which has a dispersity (Mw/Mn) in excess of 1.8 and even in excess of 2.0, when processed without molecular weight fractionation, although the dispersity depends on how to control the reaction. If such a polymerization product is used as material in chemically amplified resist compositions, the resist pattern resulting therefrom after exposure and development steps may have a profile having rounded top rather than rectangular. The use of the polymer obtained by the method of the invention in a resist composition and the formation of a resist pattern from the resist composition may follow any desired methods well known in the prior art. The application of the inventive method ensures to collect a polymer fraction having a dispersity of up to 1.8 and preferably up to 1.7 without a substantial decline of percent recovery. This ameliorates the pattern degradation pointed out above.

When a comparison is made between polymer fractions having a dispersity of up to 1.8, the polymer fraction resulting from the fractionation method of the invention is a polymer fraction having undergone better fractionation. In the positive case, better rectangularity is achievable, and a footing profile which can occur in the resist pattern in proximity to the substrate due to the substrate's surface state is improved. In the negative case, the invention controls frequent occurrence of a phenomenon that a stricture known as undercut is introduced at the interface between the resist pattern and the substrate by insufficient insolubilization of the polymer due to substrate material and surface state.

EXAMPLE

Examples of the invention are given below by way of illustration and not by way of limitation.

Example 1

Polymer for Use in Negative Resist

A 3-L flask was charged with 357.0 g of acetoxystyrene, 33.9 g of 4-chlorostyrene, 284.1 g of indene, and 1,025 g of toluene as a solvent. The reactor was cooled to −70° C. in a nitrogen atmosphere, after which vacuum evacuation and nitrogen flow were repeated three times. The reactor was warmed to room temperature, after which 60.8 g of a polymerization initiator, 2,2'-azobis(2,4-dimethylvalero-nitrile) (V-65 by Wako Pure Chemical Co., Ltd.) was added. The reaction mixture was heated at 45° C. at which reaction occurred for 20 hours and then heated at 55° C. at which reaction occurred for a further 20 hours. The reaction solution was concentrated to a one-half volume and poured into 22.5 L of methanol for precipitation. The resultant white solid was filtered and vacuum dried at 40° C., yielding 453 g of a white polymer. The polymer had a weight average molecular weight (Mw) of 5,400 and a dispersity (Mw/Mn) of 1.85. A 150-g portion of the polymer was dissolved again in 244 g of methanol and 270 g of tetrahydrofuran, to which were added 81 g of triethylamine and 16 g of water. Deprotection reaction occurred at 60° C. for 40 hours. The reaction solution was concentrated in vacuum. Thereafter, a first step of fractionation was performed by dissolving the concentrate in a solvent mixture of 274 g methanol and 56 g acetone, adding dropwise 495 g of hexane to the solution over 10 minutes while thoroughly agitating the solution, yielding a white turbid liquid mixture at the end of addition, and holding the liquid mixture for static liquid phase separation. The upper layer was removed by suction. Thereafter, a second step of fractionation was performed by adding 187 g of tetrahydrofuran to the lower layer (i.e., polymer phase), adding dropwise 515 g of hexane to the solution over 10 minutes, yielding a white turbid liquid mixture at the end of addition, and holding the liquid mixture for static liquid phase separation. The lower layer (i.e., polymer layer) was concentrated. To completely remove the triethylamine adsorbed on the polymer, the concentrate was dissolved in 435 g of ethyl acetate, and the solution was washed for neutralization and separation once with a mixture of 125 g water and 49 g acetic acid and once with 120 g water and 38 g pyridine, and washed for separation four times with 120 g water. Thereafter, the upper layer, ethyl acetate solution was concentrated, dissolved in 125 g of acetone, and precipitated in 7.5 L of water. The precipitate was filtered and vacuum dried at 50° C. for 40 hours, yielding 92 g of a white polymer.

The polymer was analyzed by $^{13}$C— and $^1$H-NMR and GPC, with the results shown below.
Copolymerized composition ratio
hydroxystyrene:4-chlorostyrene:indene=76.0:6.5:17.5
Mw=4,200
Mw/Mn=1.55

Comparative Example 1-1

Another 150-g portion of the polymer resulting from the polymerization reaction in Example 1 prior to hydrolysis was dissolved again in 244 g of methanol and 270 g of tetrahydrofuran, to which were added 81 g of triethylamine and 16 g of water. Deprotection reaction occurred at 60° C. for 40 hours. The reaction solution was concentrated. Thereafter, a first step of fractionation was performed by dissolving the concentrate in a solvent mixture of 274 g methanol and 56 g acetone, adding dropwise 495 g of hexane to the solution over 10 minutes, yielding a white turbid liquid mixture at the end of addition, and holding the liquid mixture for static liquid phase separation. The lower layer (polymer layer) was taken out and concentrated again. Thereafter, a second step of fractionation was performed by dissolving the polymer as concentrated in a mixture of 274 g methanol and 56 g acetone, adding 495 g of hexane to the solution, effecting dispersion and phase separation, and concentrating the resulting lower layer (polymer layer). The concentrate was dissolved in 435 g of ethyl acetate, and the solution was washed for neutralization and separation once with a mixture of 125 g water and 49 g acetic acid and once with 120 g water and 38 g pyridine, and washed for separation four times with 120 g water. Thereafter, the upper layer, ethyl acetate solution was concentrated, dissolved in 125 g of acetone, and precipitated in 7.5 L of water. The precipitate was filtered and vacuum dried at 50° C. for 40 hours, yielding 94 g of a white polymer.

The polymer was analyzed by GPC, with the results shown below.
Mw=4,000
Mw/Mn=1.62

Comparative Example 1-2

Another 150-g portion of the polymer resulting from the polymerization reaction in Example 1 prior to hydrolysis was dissolved again in 244 g of methanol and 270 g of tetrahydrofuran, to which were added 81 g of triethylamine and 16 g of water. Deprotection reaction occurred at 60° C. for 40 hours. The reaction solution was concentrated. Thereafter, a first step of fractionation was performed by dissolving the concentrate in a solvent mixture of 274 g methanol and 56 g acetone, adding dropwise 495 g of hexane to the solution over 10 minutes, yielding a white turbid liquid mixture at the end of addition, and holding the liquid mixture for static liquid phase separation. The lower layer (polymer layer) was taken out. Thereafter, a second step of fractionation was performed by adding a solvent mixture of 140 g methanol and 35 g acetone to the polymer layer, adding 515 g of hexane to the solution, effecting dispersion and phase separation, and concentrating the resulting lower layer (polymer layer). The concentrate was dissolved in 435 g of ethyl acetate, and the solution was washed for neutralization and separation once with a mixture of 125 g water and 49 g acetic acid and once with 120 g water and 38 g pyridine, and washed for separation four times with 120 g water. Thereafter, the upper layer, ethyl acetate solution was concentrated, dissolved in 125 g of acetone, and precipitated in 7.5 L of water. The precipitate was filtered and vacuum dried at 50° C. for 40 hours, yielding 93 g of a white polymer.

The polymer was analyzed by GPC, with the results shown below.
Mw=4,100
Mw/Mn=1.59

Example 2

Polymer for Use in Positive Resist

A 2-L flask was charged with 82.4 g of acetoxystyrene, 26.0 g of 4-t-butoxystyrene, 11.6 g of t-butyl methacrylate, and 300 g of tetrahydrofuran as a solvent. The reactor was cooled to −70° C. in a nitrogen atmosphere, after which vacuum evacuation and nitrogen flow were repeated three times. The reactor was warmed to room temperature, after which 9.6 g of a polymerization initiator AIBN was added. The reaction mixture was heated at 60° C. at which reaction occurred for 15 hours. The reaction solution was concentrated to a one-half volume and poured into a mixture of 9.0 L methanol and 1.0 L water for precipitation. The resultant white solid was filtered and vacuum dried at 60° C., yielding 89 g of a white polymer. The polymer had a weight average molecular weight (Mw) of 21,000 and a dispersity (Mw/Mn) of 1.81. A 40-g portion of the polymer was dissolved again in 400 g of methanol and 800 g of tetrahydrofuran, to which 70 g of triethylamine and 15 g of water were added, and deprotection reaction occurred. The reaction solution was neutralized with acetic acid, concentrated, and dissolved in 0.5 L of acetone, whereupon deprotection reaction occurred at 60° C. for 40 hours. The reaction solution was concentrated. Thereafter, a first step of fractionation was performed by dissolving the concentrate in a solvent mixture of 200 g methanol and 80 g acetone, adding dropwise 400 g of hexane to the solution over 10 minutes, yielding a white turbid liquid mixture at the end of addition, and holding the liquid mixture for static liquid phase separation. The lower layer (polymer layer) was taken out. Thereafter, a second step of fractionation was performed by adding 150 g of tetrahydrofuran to the lower layer, adding 400 g of hexane to the solution, and effecting dispersion and phase separation. The resulting lower layer (i.e., polymer layer) was concentrated. The concentrate was dissolved in 700 g of ethyl acetate, and the solution was washed for neutralization and separation once with a mixture of 180 g water and 50 g acetic acid and once with 170 g water and 35 g pyridine, and washed for separation four times with 150 g water. Thereafter, the upper layer, ethyl acetate solution was concentrated, dissolved in 250 g of acetone, and precipitated in 10 L of water. The precipitate was filtered and vacuum dried at 50° C. for 40 hours, yielding 67 g of a white polymer.

The polymer was analyzed by $^{13}$C— and $^1$H-NMR and GPC, with the results shown below.
Copolymerized composition ratio
hydroxystyrene:styrene:t-butyl methacrylate
=67.2:8.5:24.3
Mw=16,800
Mw/Mn=1.57

Comparative Example 2

Another 40-g portion of the polymer resulting from the polymerization reaction in Example 2 prior to hydrolysis was dissolved again in 400 g of methanol and 800 g of tetrahydrofuran, to which were added 70 g of triethylamine and 15 g of water. Deprotection reaction occurred at 60° C. for 40 hours. The reaction solution was concentrated. Thereafter, a first step of fractionation was performed by dissolving the concentrate in a solvent mixture of 200 g methanol and 50 g acetone, adding dropwise 440 g of hexane to the solution over 10 minutes, yielding a white turbid liquid mixture at the end of addition, and holding the liquid mixture for static liquid phase separation. The lower layer (polymer layer) was taken out. Thereafter, a second step of fractionation was performed by dissolving the lower layer in a mixture of 200 g methanol and 50 g acetone, adding 400 g of hexane to the solution, effecting dispersion and phase separation, and concentrating the resulting lower layer (polymer layer). The concentrate was dissolved in 700 g of ethyl acetate, and the solution was washed for neutralization and separation once with a mixture of 180 g water and 50 g acetic acid and once with 170 g water and 35 g pyridine, and washed for separation four times with 150 g water. Thereafter, the upper layer, ethyl acetate solution was concentrated, dissolved in 250 g of acetone, and precipitated in 10 L of water. The precipitate was filtered and vacuum dried at 50° C. for 40 hours, yielding 69 g of a white polymer.

The polymer was analyzed by GPC, with the results shown below.

Mw=16,100
Mw/Mn=1.65

Example 3 and Comparative Examples 3-1 and 3-2

Resist Pattern Formation Test

Using the polymers obtained in Example 1 and Comparative Examples 1-1 and 1-2, chemically amplified negative resist compositions were prepared according to the following recipe.

| Components | Parts by weight |
|---|---|
| Polymer | 80 |
| Crosslinker (tetramethoxyglycoluril) | 8.2 |
| PAG1 (triphenylsulfonium 2,5-dimethylbenzene sulfonate) | 8 |
| PAG2 (triphenylsulfonium 2,4,6-triisopropyl benzenesulfonate) | 2 |
| Basic compound (tris(2-methoxyethyl)amine) | 0.4 |
| Solvent 1 (propylene glycol monomethyl ether acetate) | 320 |
| Solvent 2 (ethyl lactate) | 760 |

Each of the resist compositions was filtered through a nylon resin filter having a pore size of 0.02 μm. The resist solution was applied onto a mask blank having an outermost surface of chromium oxynitride via spin coating to a thickness of 0.15 μm. The mask blank was baked on a hot plate at 110° C. for 10 minutes, exposed to electron beam by means of an EB exposure system HL-800D (Hitachi High-Technologies Corp., accelerating voltage 50 kev), post-exposure baked (PEB) at 120° C. for 10 minutes, and developed in an aqueous solution of 2.38 wt % tetramethylammonium hydroxide, yielding a negative resist pattern.

The resist patterns were evaluated as follows. The optimum exposure dose (sensitivity Eop) was the exposure dose which provided a 1:1 resolution at the top and bottom of a 0.20-μm line-and-space pattern. The minimum line width (μm) of a line-and-space pattern which was ascertained separate on the mask blank when processed at the optimum dose (Eop) was the maximum resolution of a test resist. The profile of the resist pattern as resolved was examined by observing a resist section under a scanning electron microscope, and specifically inspecting for any undercut in proximity to the substrate (see FIG. 1).

TABLE 1

| | Eop (μC/cm$^2$) | Maximum resolution (μm) | Undercut |
|---|---|---|---|
| Example 3 | 9.2 | 0.06 | Slight |
| Comparative Example 3-1 | 9.2 | 0.08 | Large |
| Comparative Example 3-2 | 9.2 | 0.06 | Small |

Example 4 and Comparative Example 4

Resist Pattern Formation Test

Using the polymers obtained in Example 2 and Comparative Example 2, chemically amplified positive resist compositions were prepared according to the following recipe.

| Components | Parts by weight |
|---|---|
| Polymer | 80 |
| PAG3 (triphenylsulfonium 4-(4'-methylphenyl sulfonyloxy)benzenesulfonate) | 2 |
| PAG4 ((4-tert-butoxyphenyl)diphenylsulfonium 10-camphorsulfonate) | 1 |
| Basic compound (tris(2-methoxyethyl)amine) | 0.2 |
| Solvent 1 (propylene glycol monomethyl ether acetate) | 300 |
| Solvent 2 (ethyl lactate) | 130 |

Each of the resist compositions was filtered through a nylon resin filter having a pore size of 0.02 μm. The resist solution was applied onto a mask blank having an outermost surface of chromium oxynitride via spin coating to a thickness of 0.60 μm. The mask blank was baked on a hot plate at 110° C. for 10 minutes, exposed to electron beam by means of an EB exposure system HL-800D (Hitachi High-Technologies Corp., accelerating voltage 50 keV), post-exposure baked (PEB) at 120° C. for 10 minutes, and developed in an aqueous solution of 2.38 wt % tetramethylammonium hydroxide, yielding a positive resist pattern.

Figure 2:
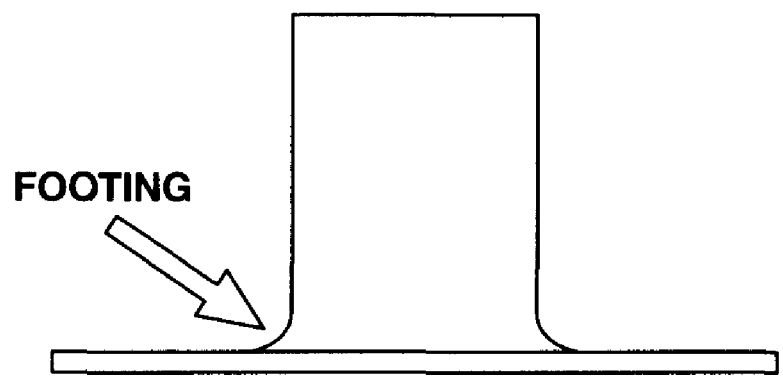
FIG. 2 schematically illustrates a resist pattern with footing.

The resist patterns were evaluated as in Example 3. The profile of the resist pattern was examined under a SEM, specifically by inspecting for any footing in proximity to the substrate (see FIG. 2).

TABLE 2

| | Eop (μC/cm$^2$) | Maximum resolution (μm) | Footing |
|---|---|---|---|
| Example 4 | 12.3 | 0.16 | Slight |
| Comparative Example 4 | 12.3 | 0.17 | Moderate |

Japanese Patent Application No. 2007-190592 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for synthesizing a polymer for use in photoresist compositions, comprising:
   performing a polymerization reaction to form a polymerization product mixture comprising a polymer and
   subjecting the polymerization product mixture to molecular weight fractionation,
   wherein the molecular weight fractionation step is a liquid-liquid phase separation technique;
   wherein the liquid-liquid phase separation technique comprises two or more iteration steps wherein an iteration step (a) comprises:
      dissolving the polymerization product mixture in a good solvent (A),
      adding a poor solvent (A) to the good solvent (A) containing the polymerization product mixture, then
      forming a liquid poor solvent phase and a liquid polymer-containing phase,
      separating the liquid poor solvent phase (a) from the liquid polymer-containing phase (a), and then
   performing an iteration step (b) on the liquid polymer-containing phase, wherein the iteration step (b) comprises
      adding a good solvent (B) that is different from the good solvent (A) to the liquid polymer-containing phase and the good solvent (B) has a higher dissolving power of the polymer than the good solvent (A),
      adding a poor solvent (B) to the good solvent (B) containing the liquid polymer-containing phase, then
      forming a liquid poor solvent phase (b) and a liquid polymer-containing phase (b), and
      separating the liquid poor solvent phase (b) from the liquid polymer-containing phase (b).

2. The method of claim 1, wherein the good solvent (B) is a different type of solvent than the good solvent (A).

3. The method of claim 1, wherein the good solvent (B) is a mixture of two or more solvents in a mixing ratio that is different from the mixing ratio of the same solvents in the good solvent (A).

4. The method of claim 1 wherein the polymer recovered at the end of the at least two iterations of fractionation has a dispersity equal to or less than 1.8, the dispersity being defined as weight average molecular weight divided by number average molecular weight.

5. The method of claim 1, wherein the good solvent (A) and the good solvent (B) is selected from the group consisting of acetone, ethyl acetate, methyl acetate, propylene glycol monomethyl ether, propylene glycol monoethyl ether, tetrahydrofuran, diethyl ether, butyl acetate, amyl acetate, cyclohexyl acetate, 3-methoxybutyl acetate, methyl ethyl ketone, methyl amyl ketone, cyclohexanone, cyclopentanone, 3-ethoxyethyl propionate, 3-ethoxymethyl propionate, 3-methoxymethyl propionate, methyl acetoacetate, ethyl acetoacetate, diacetone alcohol, methyl pyruvate, ethyl pyruvate, propylene glycol monomethyl ether, propylene glycol monoethyl ether, propylene glycol monomethyl ether propionate, propylene glycol monoethyl ether propionate, ethylene glycol monomethyl ether, ethylene glycol monoethyl ether, diethylene glycol monomethyl ether, diethylene glycol monoethyl ether, 3-methyl-3-methoxybutanol, N-methylpyrrolidone, dimethyl sulfoxide, γ-butyrolactone, propylene glycol methyl ether acetate (PGMEA), propylene glycol ethyl ether acetate, propylene glycol propyl ether acetate, methyl lactate, ethyl lactate, propyl lactate, tetramethylene sulfone, methanol and ethanol.

6. The method of claim 5, wherein the poor solvent (A) and the poor solvent (B) is selected from the group consisting of water, heptane, hexane, pentane, cyclohexane, benzene and toluene.

7. The method of claim 1, wherein a total of two iteration steps is performed.

8. The method of claim 1, wherein a total of four iteration steps is performed.

9. The method of claim 1, wherein a total of six iteration steps is performed.

* * * * *